(12) United States Patent
Hwang et al.

(10) Patent No.: US 7,747,554 B2
(45) Date of Patent: Jun. 29, 2010

(54) REAL-TIME BUSINESS PROCESS TRIGGERING SYSTEM AND METHOD USING RFID

(75) Inventors: Jae-Gak Hwang, Daejon (KR);
Seong-Hwan Choi, Daejon (KR);
Yong-Joon Lee, Daejon (KR);
Sung-Wook Kim, Daejon (KR);
Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 574 days.

(21) Appl. No.: 11/722,166

(22) PCT Filed: Dec. 29, 2004

(86) PCT No.: PCT/KR2004/003504
§ 371 (c)(1),
(2), (4) Date: Jun. 19, 2007

(87) PCT Pub. No.: WO2006/068338
PCT Pub. Date: Jun. 29, 2006

(65) Prior Publication Data
US 2008/0294585 A1 Nov. 27, 2008

(30) Foreign Application Priority Data
Dec. 20, 2004 (KR) .................. 10-2004-0108969

(51) Int. Cl.
G06F 17/00 (2006.01)
G06N 5/02 (2006.01)
(52) U.S. Cl. ...................................... 706/47
(58) Field of Classification Search .................. 707/10, 707/1; 705/10; 706/47
See application file for complete search history.

(56) References Cited

U.S. PATENT DOCUMENTS
6,775,658 B1    8/2004   Zothner

FOREIGN PATENT DOCUMENTS
KR   10-2002-0048916 A   6/2002
KR   10-2003-0089683 A   11/2003
WO   WO 03/061366 A2    7/2003

*Primary Examiner*—Donald Sparks
*Assistant Examiner*—Ola Olude Afolabi

(57) ABSTRACT

Provided is a real-time business process triggering system (RBPTS) using a Radio Frequency Identification (RFID) and a method thereof. The RBPTS is to provides interface to a corporation information system by generating an RFID event proper to a specific domain by giving the RFID data a business meaning to apply the RFID data to a predetermined rule before transmitting the RFID data to the corporation information system, provide a rule modeling function to flexibly managing changes in application field and environment, and provide an RFID related-action related to rule performance, and a method thereof. The RBPTS includes: an RFID middleware adapter for receiving RFID data from an RFID middleware/RFID reader and generating RFID events Extensible Markup Language (XML) document; an event manager for receiving the RFID events XML document from the RFID middleware adapter and generating an event query for inference; a rule manager for generating a result set by performing rule inference on the event query through an inference engine and generating an action list; Web Service arbitrator for communicating through Web Service using an external application and a Simple Object Access Protocol (SOAP); an action manager for performing real-time action by calling the Web Service through the Web Service arbitrator based on the action list; and an event repository for storing and managing registered all RFID event information, rule and action. The RBPTS is applied to maritime freight transportation.

9 Claims, 5 Drawing Sheets

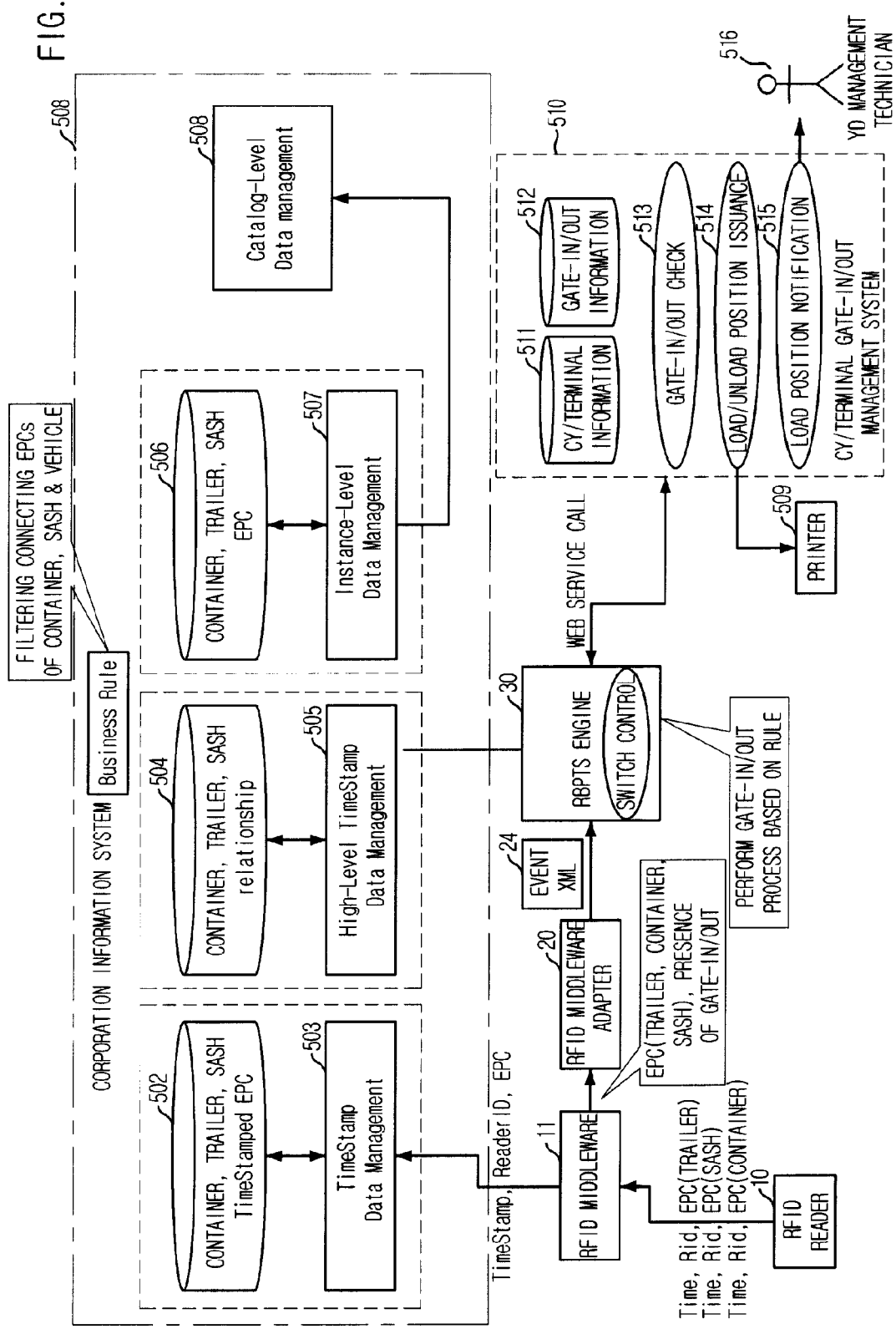

REAL-TIME BUSINESS PROCESS TRIGGERING SYSTEM AND METHOD USING RFID

TECHNICAL FIELD

The present invention relates a real-time business process triggering system (RBPTS) using a Radio Frequency Identification (RFID) and a method thereof; and, more particularly, to an RBPTS which can provide process automation and data management services in real-time by giving an event to non-refined data of an RFID tag reader and data refined through an RFID middleware, applying a predetermined rule inference to the data and providing a standard interface capable of communicating with diverse corporation applications, which are related to a business process of internal affairs of a corporation or between companies, and a method thereof.

BACKGROUND ART

A Radio Frequency Identification (RFID) is a non-contact automatic identification technology for identifying an object automatically without contacting the object by attaching an RFID tag to the object to be identified and communicating with the RFID tag by using an RFID reader through transmission/reception of radio frequencies. The RFID technology can complement shortcomings of a bar code, which is a conventional automatic identification technology, and an optical letter recognition technology.

Therefore, RFID innovators expect development in building a distribution network and process by attaching the tag to a product and using RFID data. An ultimate purpose of the RFID technology is combining the RFID technology to conventional information systems in real-time by introducing the RFID data into an applicable business process of a corporation. Herein, the RFID middleware filters data continuously coming in from the RFID Tag reader and transmits the data to a specific application. However, since RFID data, which do not have information on an application field and an environment, do not give a specific meaning to the corporation information system, it is not possible to introduce the RFID data to the business process of the corporation flexibly.

This calls for a method for providing an interface with the corporation information system by generating an RFID event which is proper to a specific domain by giving the RFID data a business meaning to apply the RFID data to a predetermined rule before transmitting the RFID data to the corporation information system, and providing a modeling function of the rule to flexibly managing a change of an application field and an environment and providing a function related to an RFID action, which is related to a rule performance.

As an example of a prior art related to the present invention, U.S. Pat. No. 6,775,658, granted on Dec. 2, 1999, discloses "Notification by business rule trigger control" providing a user an alarm service by using a rule-based technology, and the prior art maximizes reuse and flexibility of the code by separating a business logic from an inside program source and forming the business logic as a business rule.

Although the prior art is very similar to the present invention in providing of a rule-based service, the prior art provides only a function for registering a simple alarm service and has a Common Object Request Broker (CORBA)-based architecture differently from the present invention. On the other hand, the present invention automates an RFID related business process by processing real-time data with a rule-based engine and interfacing them with the corporation information system. In short, whereas the prior technology provides a service adaptable to a business policy and an adaptability when there is a change of a domain, the present invention can maximize automation of the business process by generating a meaningful event in real-time information by using the RFID technology and providing the event to the corporation information system.

DISCLOSURE

Technical Problem

Therefore, it is an object of the present invention to provide a real-time business process triggering system (RBPTS) that can provide an interface between RFID data and a corporation information system by generating an RFID event, which is proper to a specific domain, by giving the data a business meaning to apply the RFID data to a predetermined rule before transmitting the RFID data to the corporation information system, providing a modeling function of the rule to flexibly manage a change of an application field and an environment, and provide a performance function of an RFID related-action in connection with rule implementation, and a method thereof.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

Technical Solution

In accordance with one aspect of the present invention, there is provided a real-time business process triggering system (RBPTS), including: a Radio Frequency Identification (RFID) middleware adapter for receiving RFID data from an RFID middleware/RFID reader and generating an RFID event Extensible Markup Language (XML) document to apply the RFID data to a rule; an event manager for receiving the RFID event XML document from the RFID middleware adapter and generating an event query required for inference of the rule; a rule manager for generating a result set by performing rule inference on the event query through an inference engine and generating an action list required for performing action based on the generated result set; a Web Service arbitrator for communicating through Web Service using an external application and a Simple Object Access Protocol (SOAP); an action manager for performing action in real-time by calling the Web Service through the Web Service arbitrator based on the action list; and an event repository for storing and managing registered all RFID event information, rule and action.

In accordance with another aspect of the present invention, there is provided a method for executing a real-time business process in a real-time business process triggering system (RBPTS), including: a) receiving Radio Frequency Identification (RFID) data from an RFID middleware/RFID reader and generating an RFID event Extensible Markup Language (XML) document to apply the RFID tag data to a rule; b) generating an event query for inference based on the RFID event XML document, generating a result set by inferring a rule on the event query through an inference engine based on the event query, and generating an action list required for performing action from the generated result set; and c) performing action in real-time by calling Web Service based on the action list The present invention generates an event-condition-action-based RFID event by applying non-refined data of an RFID tag reader or data refined through RFID middleware to a rule and checking each condition after applying the RFID event to the rule, thereby providing process automation and data management services of diverse corporation applications, which are related to a business process of internal affairs of a corporation or between companies, in real-time.

Accordingly, the present invention performs diverse actions inferred from an RBPTS engine in real-time by performing a predetermined rule on the refined data continuously coming in through an RFID middleware, Herein, the action includes a sporadic function, a DB call, process of diverse electronic/mechanical devices, and continuous business process requiring a sequential/parallel process, i.e., workflow management.

Also, the present invention generates an RFID event set for implementation of a predetermined rule by performing filtering and buffering on the non-refined data continuously incoming through an RFID tag reader and transmits the generated RFID event to all applications and a rule-based engine of the RBPTS registering a listener, which is proper to a reference of an interface provided by the RBPTS.

The present invention aims at the RBPTS which can dynamically perform planning, consideration, determination on frequent events and changes happening in a real world by reorganizing diverse forms of knowledge, which an object of the real world can have, in the form of an event-rule-action, modeling and registering diverse forms of rules and building an event-based rule system. Source data read by the RFID reader can be designed to induce a rule system in a refined or non-refined form, be formed of an event, which is proper to a specific domain, perform a work corresponding to the action of an inferred rule by inducing performance of a business process management system of the inside of the corporation or between companies through a procedure of the rule inference, thereby inducing a dynamic action of a corporation information system, an application and a database system based on a status, i.e., the event.

Therefore, when an RFID environment is applied, the present invention can maximize efficiency through automation of the business process of the corporation by overcoming limitation of the conventional inactive information system and providing real-time information using an RFID technology to the information system. Also, since the present invention controls flow of information without interruption of a man and generates a meaningful event by applying the rule to the provided real-time data, the present invention can provide a mechanism for applying the meaningful event to the corporation information system.

ADVANTAGEOUS EFFECTS

The present invention generates a Radio Frequency Identification (RFID) event to transmit RFID data to an information system of a corporation and gives the RFID data a meaning by applying the RFID event to an event-condition-action-based rule, whose modeling is performed by a user, thereby providing an interface to the corporation information system, a modeling function of the rule to flexibly dealing with a change of an application field and an environment, and a function of RFID related-action performance in real-time.

Also, the present invention can maximize efficiency through automation of the business process of the corporation by overcoming limitation of the conventional static information system and providing real-time information to the corporation information system. Also, since the present invention controls flow of information without interruption of a man and generates a meaningful event by applying the rule to the provided real-time data, the present invention can be applied to the corporation information system compatibly.

DESCRIPTION OF DRAWINGS

The above and other objects and features of the present invention will become apparent from the following description of the preferred embodiments given in conjunction with the accompanying drawings, in which:

FIG. 5 is a diagram showing a scenario model for operating maritime freight transportation terminal/Container Yard (CY) gate-in/out management process in accordance with an embodiment of the present invention.

BEST MODE FOR THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on prior art may blur the points of the present invention, the detailed description will not be provided herein. The preferred embodiments of the present invention will be described in detail hereinafter with reference to the attached drawings.

Figure 1:
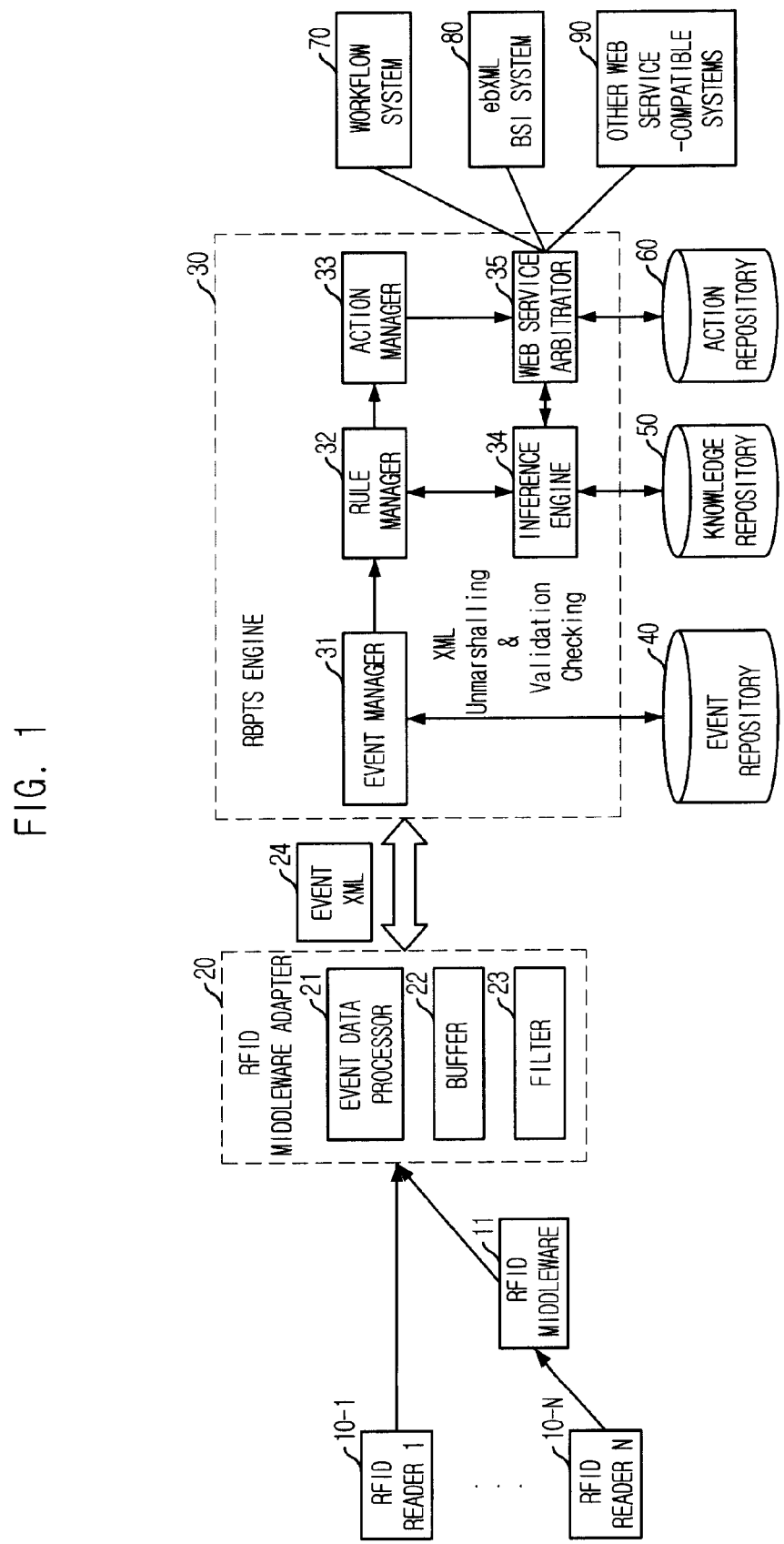
FIG. 1 is a block diagram showing a real-time business process triggering system (RBPTS) in accordance with an embodiment of the present invention.

FIG. 1 is a block diagram showing a real-time business process triggering system (RBPTS) in accordance with an embodiment of the present invention.

As shown in FIG. 1, the RBPTS of the present invention includes an RFID Middleware Adaptor 20 and an RBPTS engine 30.

The RBPTS system provides an interface to a corporation information system by generating an RFID event, which is proper to a specific domain, by giving the data a business meaning to apply the RFID data to a predetermined rule before transmitting the RFID data to the information system of the company, provides a modeling function of the rule to flexibly manage a change of an application field and an environment, and provides a performance function of an RFID related-action, which is related to a rule performance.

Herein, giving the RFID data a meaning means modeling information required for a specific field by a user as a rule and generating an event by reorganizing the RFID data into a form proper to the rule.

Also, the inference engine 34 of the RBPTS generates a rule set by using a Backward Chaining algorithm to process the continuously generated RFID event and determines whether to execute the rule by fulfilling conditions of each rule. In the performance of the conditions are satisfied, the data of the RFID event can be compared with data of the conventional information system, be used in a result of an intermediate procedure of the process generated in the conventional information system or commit the determination to the user.

Also, when a condition of a related-rule is satisfied, the RFID action is executed, and the RFID action can be used by being connected to a sporadic DB query, an electronic/mechanical device drive or a corporation information system. The RFID action includes performance of a business process with an internal/external business corporation or workflow management.

Accordingly, the RBPTS includes a RFID middleware adapter 20 for receiving the RFID data from an RFID middleware 11 or an RFID reader 10-1 and generating an RFID event full XML document 24 to apply the RFID data to a rule, an event manager 31 for receiving the RFID event XML document 24 from the RFID middleware adapter 20 and generating an event query for inference, a rule manager 32 for generating a result set by performing rule inference on the event query through the inference engine 34 and generating an action list required for performing the action from the generated result set, a Web Service arbitrator 35 for communication through Web Service by using external applications 70 to 90, and Simple Object Access Protocol (SOAP), an action manager 33 for performing the action in real-time by calling the Web Service through the Web Service arbitrator 35 based on the action list, an event repository 40 for storing and managing registered all RFID event information, rules and actions, a knowledge repository 50 and an action repository 60.

Herein, the RFID middleware adapter 20 includes a buffer 22 for buffering continuous data coming in from the RFID middleware 11 or the RFID reader 10-1, i.e., refined RFID data or non-refined RFID data, a filter 23 for filtering the non-refined RFID data based on registration event schema information and an event data processor 21 for generating the RFID event XML document 24 to be applied to the rule from the RFID data, which are the refined RFID data or refined RFID data filtering non-refined RFID data.

The event repository 40 stores and manages registration RFID event information, and the knowledge repository 50 stores and manages the registration rule. The action repository 60 stores and manages the registration action.

The event XML document 24 has an event schema structure suggested in the present invention, and Reader identification (Id), electronic product code (EPC) Id and Timestamp, which are RFID related-attributes, are described by using Physical Markup Language (PML) Core.

An operation procedure of the RBPTS suggested in the present invention having the above formation will be described in detail hereinafter.

The RFID middleware adapter 20 connected to the RBPTS engine 30 requests process of the RFID Event XML document 24 to the RBPTS engine 30 through the Web Service interface. The event XML document follows the event schema defined in a rule model based on event-condition-action pre-registered in an RBPTS system 106 and is generated through the process as shown in FIG. 2.

Figure 2:
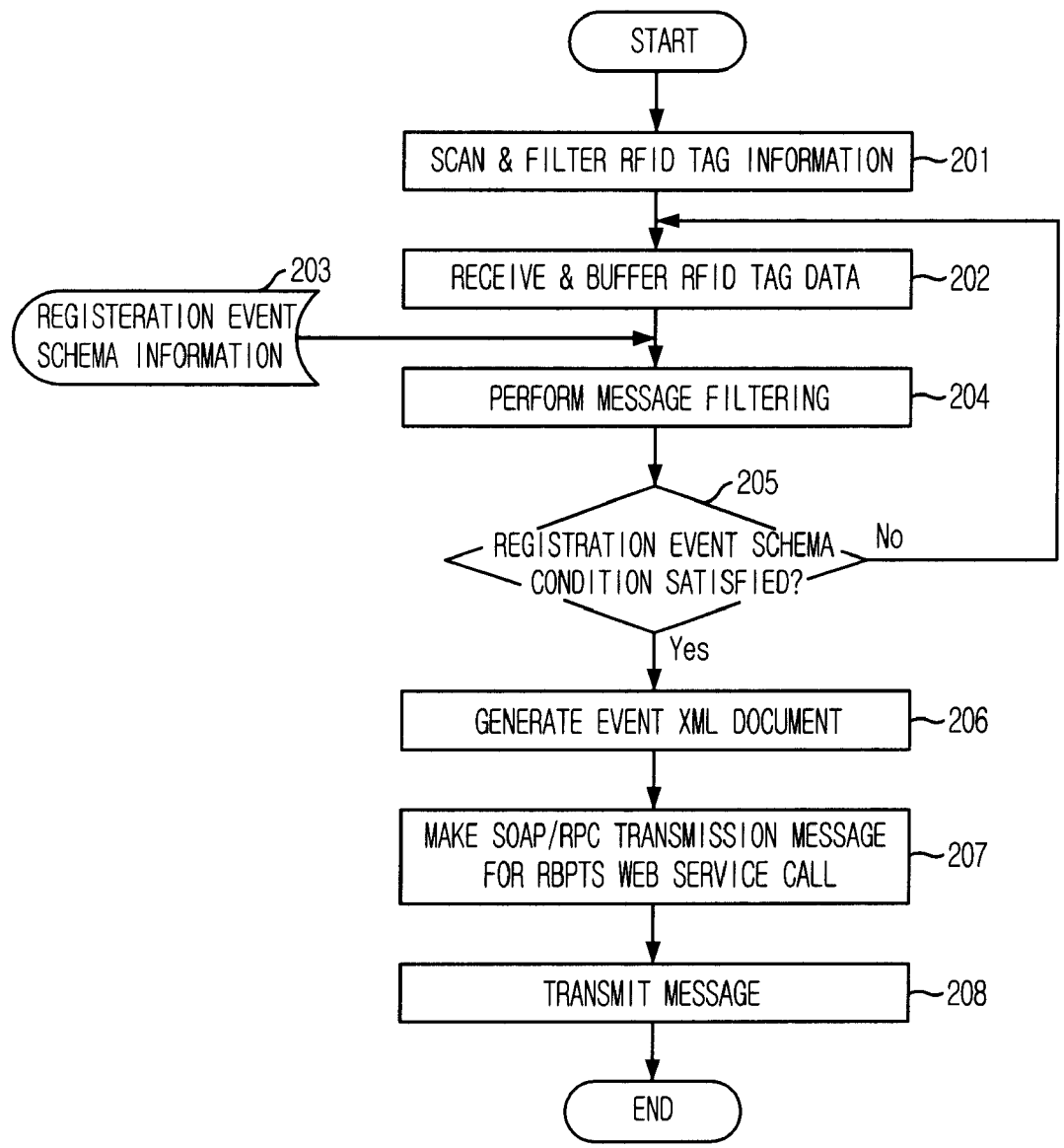
FIG. 2 is a flowchart illustrating a process for generating the Radio Frequency Identification (RFID) Event Extensible Markup Language (XML) document by receiving the RFID Tag data among real-time business process methods in accordance with an embodiment of the present invention.

FIG. 2 is a flowchart illustrating a process for generating the RFID Event XML document by receiving the RFID Tag data among the real-time business process methods in accordance with an embodiment of the present invention.

At step 201, RFID tag information is scanned through RFID readers 10-1 to 10-N, and the scanned information incomes after being filtered as proper data form through the RFID middleware 11 or the RFID middleware adapter 20 in a scanned original data form.

At step 202, the RFID middleware adapter 20 continuously receives and buffers the data, which are the refined RFID tag data and non-refined RFID tag data, and at steps 203 and 204, message filtering is performed based on the registration event schema information.

The RFID middleware adapter 20 checks whether an event schema condition is satisfied at step 205 after performing filtering, and generates the event XML document 24 at step 206 only when the event schema condition is satisfied.

A SOAP/Remote Procedure Call (RPC) transmission message for RBPTS Web Service call is generated at step 207, and the generated message is transmitted to the RBPTS engine 30 at step 208.

A procedure for inferring the rule and forming the action execution list by event generation in the RBPTS engine 30 will be described hereinafter with reference to FIG. 3.

Figure 3:
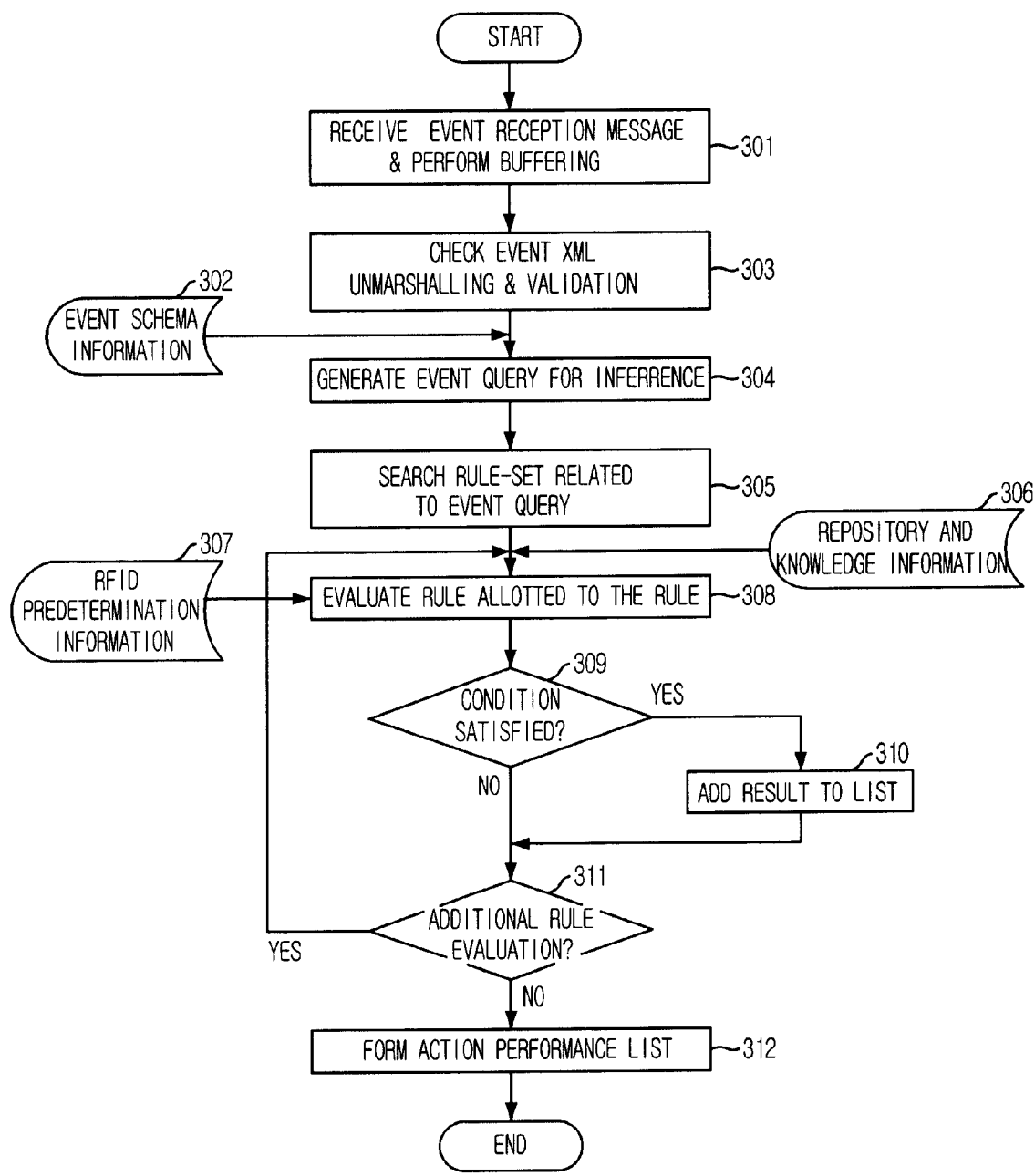
FIG. 3 is a flowchart illustrating a procedure for inferring a rule and forming the action execution list among the real-time business process methods in accordance with an embodiment of the present invention.

FIG. 3 is a flowchart illustrating a procedure for inferring the rule and forming the action execution list among the real-time business process methods in accordance with an embodiment of the present invention.

The event reception message generated as a result of FIG. 2 and transmitted to the RBPTS engine 30 is transmitted to the event manager 31 and buffering is performed, at step 301. UnMarshalling and Validation of the received event message are checked based on event schema information 302, at step 303.

Event query for inference on a checked event object is generated at step 304 and transmitted to the rule manager 32.

At step 305, a rule-set related to the event query is searched in the rule manager 32, and a data source driver required for inference and inference environment information such as knowledge information and repository information are formed. At steps 306 to 311, condition evaluation defined in the rule is performed through the inference engine 34 and a result set for the inference result is generated. At step 312, action list information for action performance is formed based on the generated result set.

Herein, a process for receiving the action execution list information formed in FIG. 3, managing the performance of the action list requested by the action manager 33 of the RBPTS engine 30, dynamically calling Web Service through the Web Service arbitrator 35, storing and managing the performance result of the action in the action repository 60 will be described hereinafter with reference to FIG. 4.

Figure 4:
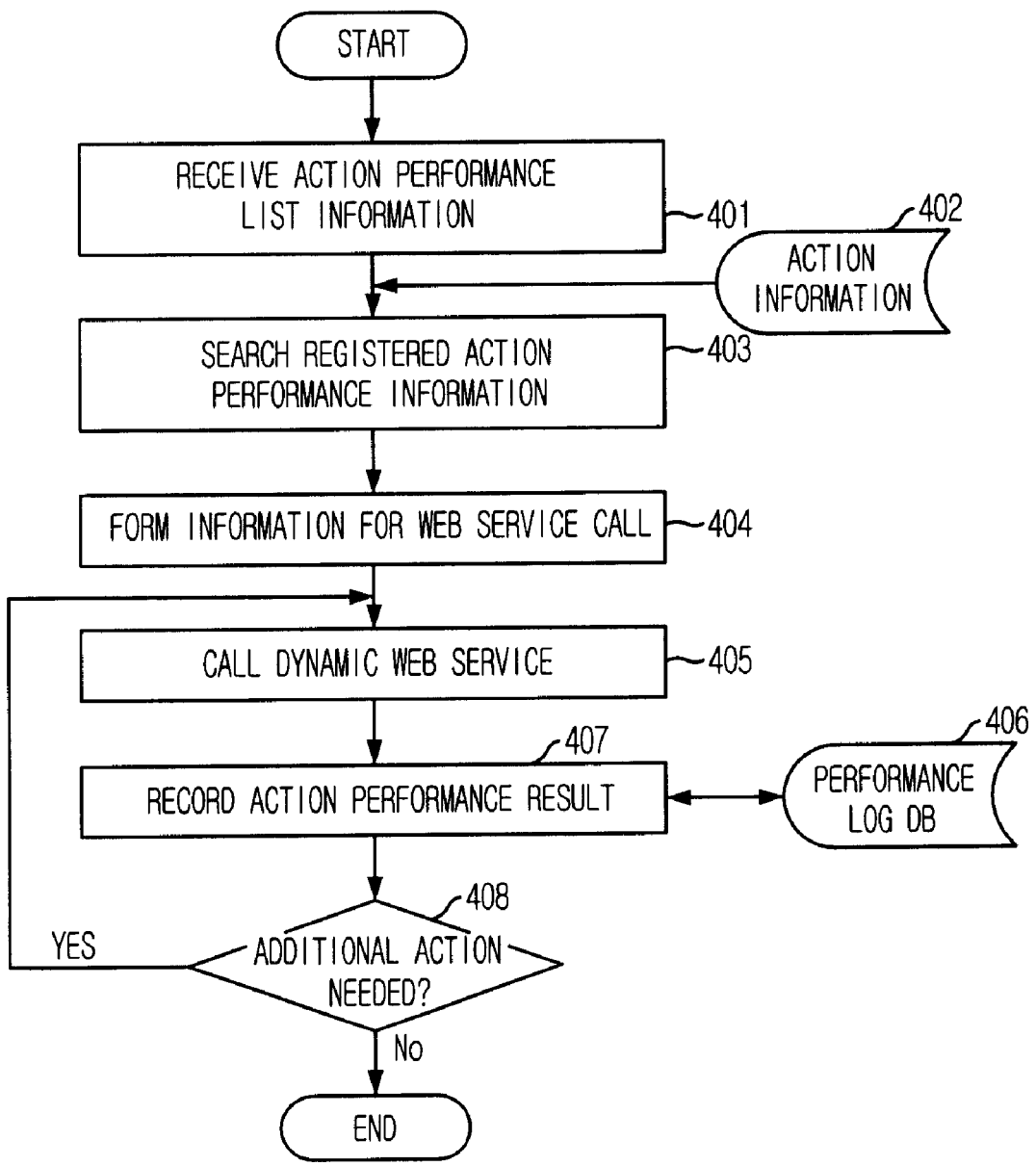
FIG. 4 is a flowchart illustrating a procedure for calling a Web Service call and storing an action performance result among the real-time business process methods in accordance with an embodiment of the present invention.

As shown in FIG. 4, action execution list information is transmitted from the rule manager 32 at step 401, and action performance information registered from the action information 402 is searched on a received action execution list in the action manager 33 at step 403.

Information for Web Service call is formed based on the search result at step 404, and Web Service call is dynamically performed at step 405. The action performance result is stored in a performance log database 406 at step 407.

The action can continue to be performed by determining whether to perform the action additionally at step 408.

Through the series of operation process, EPC Tag data for a trailer, a container and a sash are transformed into normalized event XML document and flow of information is controlled without interruption of a man. Accordingly, diverse rules required for a terminal/Container Yard (CY) gate-in/out process are inferred and meaningful actions can be performed by interacting with information system in the inside of a corporation for controlling gate-in/out of maritime freight transportation terminal gate in real-time based on the inference result.

FIG. 5 is a diagram showing a scenario model for operating maritime freight transportation terminal/CY gate-in/out management process in accordance with an embodiment of the present invention.

In the maritime freight transportation scenario, an event XML document 201 is generated as information of three EPC codes, to which the RFID Tag is attached. The information 501 includes the trailer, the container and the sash, and stored and managed in database, to which the RBPTS engine 30 can access by previously receiving gate-in/out predetermined information.

The predetermined information 502, 504 and 506 include predetermined information on the trailer, the container and the sash, related history information and catalog information.

As shown in FIG. 5, when a vehicle arrives at the terminal, the RFID Tag information on the trailer, the container and the sash is scanned by an RFID reader 10, and filtering and data transformation of recognized RFID Tag information on each of the trailer, the sash and the container are performed through the RFID middleware 11. The refined RFID data are transmitted to a corporation information system 501 or the RFID middleware adapter 20.

Subsequently, the RFID middleware adapter 20 continuously buffers the received RFID data and generates the RFID event XML document 24 for applying the rule based on the event schema. The generated XML event document 24 is formed as a Web Service call message, i.e., SOAP/RPC transmission message for transmission from the RBPTS engine 30 and transmitted to the RBPTS engine 30.

Subsequently, the RBPTS engine 30 forms action list information to be performed through rule inference and rule condition determination by applying the rule set, which are related to pre-registered load certificate issue, unload certificate issue and gate-in/out control, and performs actions on a CY/terminal gate-in/out management system 510 such as gate-in/out check, load/unload certificate issue and load position notification to management technician through a dynamic Web Service call based on performance information of the action.

Although FIG. 5 shows the embodiment, in which the RBPTS of the present invention is applied to the maritime freight transportation, the RBPTS can be generally applied to the industry and has a merit that the RBPTS can be applied through a rule modeling of a new field without additional development of a new system.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

While the present invention has been described with respect to certain preferred embodiments, it will be apparent to those skilled in the art that various changes and modifications may be made without departing from the scope of the invention as defined in the following claims.

What is claimed is:

1. A real-time business process triggering system (RBPTS), comprising:
    a Radio Frequency Identification (RFID) middleware adapting means for receiving RFID data from an RFID middleware/RFID reader and generating an RFID event Extensible Markup Language (XML) document to apply the RFID data to a rule;
    an event managing means for receiving the RFID event XML document from the RFID middleware adapting means and generating an event query required for inference of the rule;
    a rule managing means for generating a result set by performing rule inference on the event query through an inference engine and generating an action list required for performing action based on the generated result set;
    a Web Service arbitrating means for communicating through Web Service using an external application and a Simple Object Access Protocol (SOAP);
    an action managing means for performing action in real-time by calling the Web Service through the Web Service arbitrating means based on the action list; and
    an event repository for storing and managing registered all RFID event information, rule and action.

2. The RBPTS as recited in claim 1, wherein the RFID middleware adapting means includes:
    a buffer for buffering continuous data coming in from the RFID middleware/RFID reader, which are refined RFID data or non-refined RFID data;
    a filter for filtering the non-refined RFID data based on registration event schema information; and
    an event data processing means for generating the RFID event XML document to be applied to the rule from the RFID data, which are the refined RFID data or non-refined RFID data obtained by filtering non-refined RFID data.

3. The RBPTS as recited in claim 1, wherein the RFID event XML document follows an event schema defined in an event-condition-action-based rule model pre-registered in the RBPTS, and an RFID related-attribute uses a Physical Markup Language (PML) core.

4. A method for executing a real-time business process method in a real-time business process triggering system (RBPTS), comprising:
    a) receiving Radio Frequency Identification (RFID) data from an RFID middleware/RFID reader and generating an RFID event Extensible Markup Language (XML) document to apply the RFID tag data to a rule;
    b) generating an event query for inference based on the RFID event XML document, generating a result set by inferring a rule through an inference engine based on the event query, and generating an action list required for performing action from the generated result set; and
    c) performing action in real-time by calling Web Service based on the action list.

5. The method as recited in claim 4, wherein the RFID tag data are scanned through the RFID reader and inputted into the RFID middleware adapter after being filtered in a proper data form through the RFID middleware or a scanned source data form.

6. The method as recited in claim 4, wherein the step a) includes:
    a1) continuously receiving and buffering the RFID tag data, which are refined RFID tag data or non-refined RFID tag data, in the RFID middleware adapter and performing filtering based on registered event schema information;
    a2) checking whether an event schema condition is satisfied and generating the event XML document only when the event schema condition is satisfied; and
    a3) generating a Simple Object Access Protocol (SOAP)/remote procedure call (RPC) transmission message for an RBPTS Web Service call and transmitting the generated message to the RBPTS engine.

7. The method as recited in claim 6, wherein the step b) includes:

b1) receiving the SOAP/RPC transmission message in the RBPTS engine, performing buffering and checking UnMarshaing and Validation for the received event message based on the event schema information;

b2) generating the event query for inference with respect to a checked event object;

b3) forming a data source driver for inference and inference environment information of knowledge and repository information by searching an event-related rule-set; and b4) evaluating conditions defined in the rule through the inference engine, generating an inference result set and forming action list information required for performing action based on the generated result set.

8. The method as recited in claim 7, wherein the step c) includes the steps of searching registration action execution information on the received action execution list based on the action information when the action list information is transmitted to thereby from a search result, forming information for Web Service call based on the search result, dynamically performing Web Service call and recording the action performance result in a performance log database.

9. The method as recited in claim 4, wherein a maritime freight transportation terminal/Container Yard (CY) gate-in/out managing process can be managed by applying the RBPTS to maritime freight transportation.

* * * * *